July 14, 1964     H. HACK     3,140,616

DYNAMIC BALANCING MACHINE

Filed Dec. 20, 1960     2 Sheets-Sheet 1

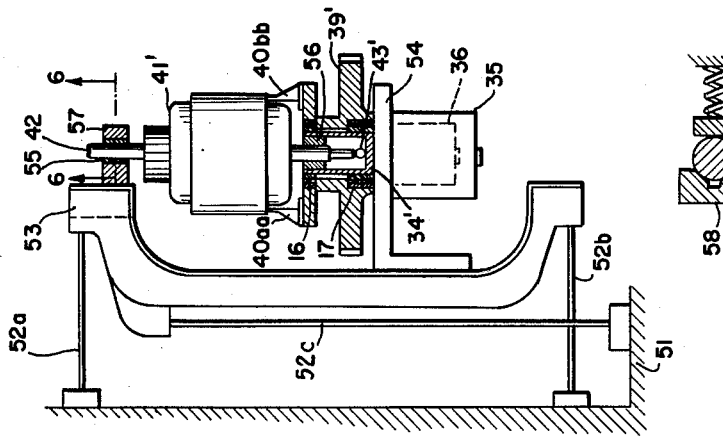
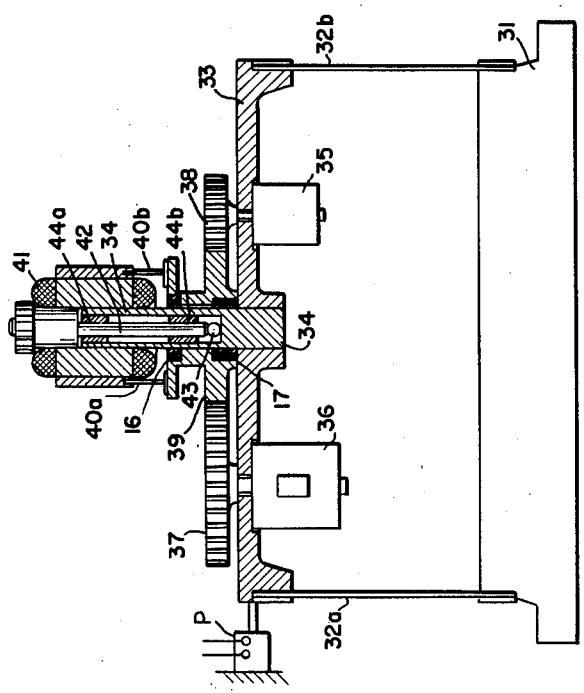

United States Patent Office 3,140,616
Patented July 14, 1964

---

3,140,616
DYNAMIC BALANCING MACHINE
Heinrich Hack, Darmstadt, Germany, assignor to Carl Schenck Maschinenfabrik G.m.b.H., Darmstadt, Germany, a corporation of Germany
Filed Dec. 20, 1960, Ser. No. 77,250
Claims priority, application Germany Dec. 21, 1959
12 Claims. (Cl. 73—460)

My invention relates to machines for the dynamic balancing of rotatable workpieces, and in a more particular aspect to machines in which the workpiece is not rigidly coupled with the drive but is kept in rotation by means of an entrainer.

The entrainer devices heretofore used in such balancing machines leave much to be desired when exacting requirements are to be met as to balancing accuracy, as well as long useful life of the entrainer device. The known sleeve-type couplings, having a groove and a clamping wedge for joining a cardanic shaft or universal-link transmission with the shaft of the workpiece to be driven, are subject to rapid wear and affect the rotor to be balanced by a variable unbalance which cannot be readily ascertained and is even more difficult to correct. Such entrainer devices, as well as the known endless-belt drives, are hardly suitable for the balancing of workpieces in assembly-line production, because they render it difficult to place the workpiece into the chuck, cage or other rotor-journalling means of the balancing machine and to connect the workpiece with the machine drive. Although these disadvantages can be avoided by employing an electro-magnetic rotary-field drive, such drives are too expensive for many purposes.

It is an object of my invention to devise the entrainer portion in a dynamic balancing machine of the above-mentioned type in such a manner as to eliminate all of the above-mentioned disadvantages heretofore encountered and to thereby provide a balancing machine, which operating with a mechanical drive for the workpiece, secures an improved accuracy of balancing operation and also facilitates mounting a workpiece on the machine and connecting it with the machine drive.

According to my invention, I provide a balancing machine with rotor-journalling means, defining an axis of rotation for the workpiece, and also with entrainer journalling means whose bearings are independent of the workpiece journalling means; I further provide additional bearing means for the drive shaft and connect the drive shaft by a speed-change transmission with the entrainer device, all of the above-mentioned journalling and bearing means being mounted on the machine portion, such as a resiliently mounted supporting bridge structure, that is subject to vibration in response to any unbalance of the rotating workpiece.

As a result, the rotating workpiece no longer has any unfavorable effect upon the accurate rotational axis of the entrainer, and any wear to which the entrainer may be subjected remains without detrimental effect upon the accuracy of the unbalance analysis. Since, further, the drive shaft, as well as any universal link or other transmission of the drive, rotates at a speed different from that of the entrainer and workpiece, any irregularity with which the drive shaft and the associated driving components may be affected has no detrimental action upon the measuring result, due to the filtering effect of the electric balance measuring equipment used for such purposes. Furthermore, since the entrainer device is rotatable independently of the workpiece, the balance condition of the entrainer device can readily and rapidly be checked or corrected at any time. In a machine according to the invention, the entrainer device can readily be given such a design that the insertion of a workpiece into the machine or the removal therefrom, such as by means of mechanical materials-handling devices, is not aggravated by the entrainer device.

The foregoing and more specific objects, advantages and features of my invention, said features being set forth with particularity in the claims annexed hereto, will be apparent from, and will be described in, the following in conjunction with the embodiments of balancing machines according to my invention illustrated by way of example on the accompanying drawings, in which:

FIG. 4 is a schematic and sectional front view of another machine designed for vertical mounting of the workpiece.

FIG. 5 is a lateral view of still another machine, shown partly in section, for vertical mounting of the workpiece.

FIG. 6 shows a detail of the machine according to FIG. 5; and

Figure 1:
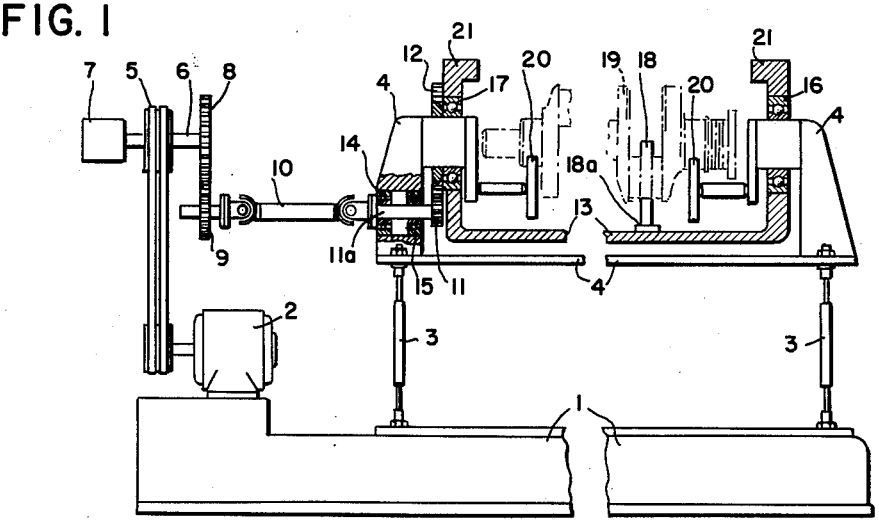
FIG. 1 is a partial and partly sectional front view showing the essential components of a balancing machine for accommodating a workpiece about a horizontal axis of rotation.

The machine shown in FIG. 1 comprises a rigid bed structure 1 on which an electric drive motor 2 and the supporting strut springs 3 for a vibratory supporting bridge structure 4 are mounted. The structure 4 serves to accommodate the rotor or workpiece 19, here illustrated as a crankshaft, which is to be balanced on the machine. The motor 2 drives a counter-shaft 6 through a transmission belt 5. The bearings (not shown) of the counter-shaft are rigidly supported on the bed structure 1. Connected with the counter-shaft 6 is a phase reference transmitter or generator 7. The shaft 6 carries a spur gear 8 meshing with a smaller spur gear or pinion 9. Gear 9 drives one end of a universal-link (cardanic) shaft 10 which is articulately connected to a drive shaft 11a. A pinion 11 on drive shaft 11a meshes with a spur gear 12 coaxially joined with a generally U-shaped bracket of an entrainer device 13. The drive shaft 11a is journalled in the supporting structure 4 by means of roller bearings 14 and 15. The entrainer device 13 with gear 12 is journalled in separate ball bearings 16, 17, also mounted on the bridge structure 4. The entrainer device comprises a hook-shaped member 18 which is rigidly joined with the bracket at 18a and serves for engaging the workpiece 19 to be entrained.

The two shaft ends of the workpiece 19 are journalled, independently of the entrainer device 13 and independently of the drive shaft 11a, on two rollers 20 whose shafts are rigidly mounted on the bridge structure 4.

The transmission ratio of gears 8 and 9 is identical with the transmission ratio of gears 11 and 12. Consequently, the phase reference generator 7, mounted independently of the vibratory supporting structure 4, is driven at the same speed as the entrainer device 13 and the workpiece 19 during operation of the machine, this speed being smaller than, for example an integral fraction such as 1:3 of the revolving speed of the drive shaft 11a.

Figure 7:
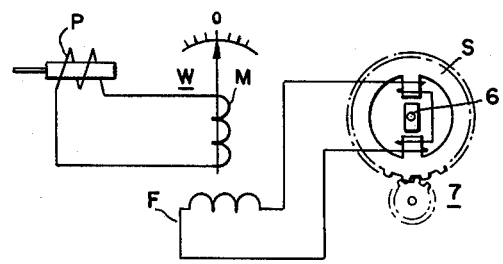
FIG. 7 is a schematic electric circuit diagram of wattmetric measuring equipment applicable with any of the machines shown in the preceding illustrations.

Due to the difference in rotational frequency between the drive shaft 11a with the linking shaft 10 on the one hand, and the entrainer 13 and phase-reference generator 7 on the other hand, any unbalance or centering errors of the linking shaft 10 cannot falsify the measuring result due to the filtering action of the measuring equipment. Such filtering action is inherently obtained when the balance measuring system of the machine is of the wattmetric type, such as schematically shown in its simplest form in FIG. 7.

When the workpiece 19, rotating in the balancing machine at the desired constant balancing speed is unbalanced, the supporting bridge structure 4 is excited to perform oscillations. These are sensed by a transducer, for example a conventional electro-dynamic pickup as shown at P in FIG. 7. The pickup translates the mechanical oscillations into a corresponding electric voltage which is in synchronism with a sinusoidal phase-reference voltage produced by the generator 7. The phase-reference voltage is impressed upon the stationary field coils F of the wattmetric measuring device W whose moving coil M is connected with the pick-up P, any necessary or desirable amplifiers or other auxiliary devices customarily used, being not illustrated in the schematic circuit diagram. When the stator S of generator 7 is turned to a position in which the pointer deflection of instrument W is a maximum, this maximum is indicative of the magnitude of the unbalance. When the stator S is turned to a position in which the pointer deflection in instrument W is zero, the angular position of the stator S is indicative of the angular location of the unbalance center relative to the workpiece.

Further details of the electrical measuring system are not shown and described because such system is known as such, for example from U.S. Patent 2,933,984. It is obvious that other, more elaborate measuring systems may likewise be used, such as those known from Reissue Patent 24,620, for example.

The above-mentioned wattmetric deflection comes about as a result of the synchronous currents flowing in the field coil F and the moving coil M respectively; but there is no response if these two currents do not have the same frequency. Consequently, and as mentioned above, any unbalance effects that may enter into the pick-up voltage because of errors inherent in the linking shaft 10 or in any other part connected with the drive shaft 11a to rotate at the drive-shaft speed, cannot falsify the measuring result. It will be understood that a similar effect is obtained in other known electric measuring systems operating with a tuned filter network for equivalent filtering action.

The entrainer device 13 can be given such a design that it completely or partially surrounds the workpiece 19, thus forming a sleeve-shaped structure. Due to the presence of the entrainer rod or hook 18, it is necessary to provide the entrainer device 13 with means for eliminating unbalance. For this purpose, the entrainer device as shown in FIG. 1 is provided with counterpoises 21 which, when using the illustrated U-shaped bracket 13, must necessarily be heavier than when the entrainer is designed as a sleeve surrounding the workpiece.

According to FIG. 1, the counterpoises 21 form a single integral piece with the bracket structure of the entrainer device. According to another feature of my invention, however, the counterpoises are individually adjustably mounted on the entrainer device to facilitate balancing the entire entrainer device by itself, independently of the workpiece. Thus, in the modification according to FIG. 2, the entrainer 13 is provided with two weights 22a and 22b which are angularly displaced 90° from each other and are located on the respective legs of the entrainer bracket 13. The two weights can be adjusted with the aid of respective screw spindles 23a and 23b. By thus displacing the weights radially with respect to the rotational axis of the entrainer, the necessary dynamic balance of the entrainer as such can readily be obtained. However, according to another feature of the invention, one or more such adjustable balancing weights on the entrainer device may also be used for compensating during the balancing run any desired unbalance that is to remain in the workpiece when finished, as is the case, for example, with crankshafts for V-type engines which intentionally comprise unbalance to compensate for the mass effects of the engine pitmans.

Figure 3:
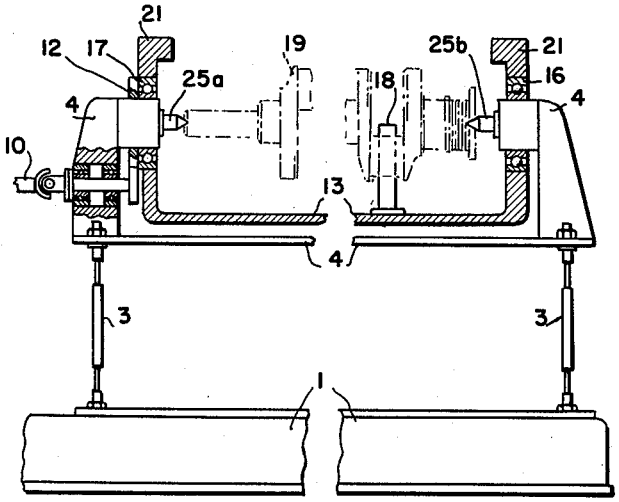
FIG. 3 is a schematic and partly sectional front view similar to FIG. 1 but showing modified means for journalling the workpiece.

The machine illustrated in FIG. 3 differs from the one described above with reference to FIG. 1 only with respect to the journalling means for the workpiece 19. According to FIG. 3 the workpiece is journalled between centering points 25a and 25b which are rigidly joined with the supporting bridge structure 4 when in operation. The points 25a, 25b, or one of them, are axially displaceable in the same manner as conventional for lathes.

According to FIG. 4, the bed structure 31 of the illustrated balancing machine supports the spring struts 32a, 32b on which the vibratory bridge structure 33 for supporting the workpiece is mounted. The workpiece-journalling means comprises a vertical sleeve structure 34 which is open at the top but has a closed bottom portion rigidly mounted on the supporting bridge 33. The sleeve structure 34 serves for guiding the workpiece and is coaxially surrounded by a spur gear 39 which is rotatable about the fixed sleeve structure. The spur gear 39 thus constitutes part of the entrainer device of the machine. Accordingly, it is journalled independently of the workpiece by means of ball bearings 16 and 17 and is driven from an electric motor 35 through a pinion 38. The gear 39 in turn drives the workpiece 41 which in this case is constituted by the rotor of an electric motor. The gear 39 further drives a spur gear 37 on the shaft of the phase-reference generator 36. In this embodiment, the drive motor 35 and the generator 36 are both mounted on the supporting bridge structure 33 to vibrate together therewith in response to any unbalance of the workpiece. The transmission ratio of gears 39 and 37 is 1:1 so that the alternating voltage generated by the generator 36 is in synchronism with the rotation of the workpiece.

The entrainer gear 39 is provided with hook members 40a and 40b which engage respective grooves in the workpiece-rotor 41. The rotor shaft 42 rests upon a steel ball 43 at the bottom of the sleeve structure 34. The sleeve structure 34 is preferably provided with internal bushings 44a and 44b for guiding the rotor shaft 42.

Due to the fact that in this machine, too, the workpiece is journalled independently of the entrainer device, these two components of the machine, when in operation, do not detrimentally affect each other.

Figure 2:
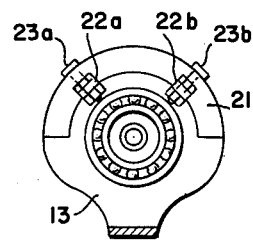
FIG. 2 is a lateral view of a somewhat modified entrainer device applicable in a machine otherwise corresponding to FIG. 1.

In the machine according to FIG. 5, the workpiece to be balanced is a complete electric motor 41'. The motor is journalled in a cup-shaped bearing 34', 43', 56 similar to the journalling means according to FIG. 4. The workpiece 41' is further journalled in a glide bearing 57. All of these bearings are fixedly mounted on a supporting bridge structure 53 which is secured to a fixed bed or building structure by strut springs 52a, 52b and 52c. The entrainer device of this machine comprises a spur gear 39' which is driven from a motor 35 by means of a pinion, not visible in FIG. 5 because located behind gear 39'. The motor 35 also drives the phase-reference generator 36 by means of another spur gear, not visible in FIG. 5 but corresponding to gear 37 in FIG. 4. The components 34', 35 and 36 are rigidly secured to a table structure 54 mounted on the supporting bridge 53, and the spur gears 37, 38 and 39', as well as the ball bearings 16, 17, are rotatably joined with the vibratorily mounted bridge structure. While the bearing ball 43' and the sleeve structure 34' correspond to those shown in FIG. 4, the sleeve 34' does not protrude above the upper edge of the entrainer gear 39'. The shaft ends of the workpiece 41' are journalled in the bushings 55 and 56. If desired, a machine of this type may also be provided with workpiece-journalling means comprising centering points as illustrated in FIG. 2. The entrainer device comprises pin plates 40aa and 40bb which are rigidly joined with the spur gear 39' and engage the workpiece. In this machine, the workpiece and the entrainer device are independently journalled in the same sense as in the machines previously described.

Shown in FIG. 6 is a somewhat modified journal bushing, corresponding essentially to the section along the line 6—6 in FIG. 5. The bushing structure comprises a body 58 which is rigidly secured to the supporting bridge 53 and forms two glide faces for engaging the shaft 42 of the workpiece 41'. The shaft is held against the glide faces of body 58 by a pressure piece 59 and a spring 60. This journalling device can readily be so designed that the wear at the three points of engagement with the shaft 42 remains practically uniform, so that no unbalance due to wear at the journal is encountered, in contrast to the journalling devices heretofore used for similar purposes.

Preferably, the rotor journalling means, such as those shown at 43' and 56, together with the appertaining entrainer devices, are made exchangeable as far as is necessary to permit using the same balancing machine for workpieces of different designs or different sizes. It will also be obvious to those skilled in the art that the design of the entrainer device may be modified in various respects and hence may be given embodiments other than particularly illustrated and described herein.

It will be understood from the embodiments described above, that the invention readily affords first balancing the entrainer device alone, and that this can be done in a relatively easy manner, before the workpiece is inserted into the machine, and then balanced with respect to its own unbalance. As further explained, machines according to the invention reliably prevent the occurrence of undiscovered or spurious unbalance effects either during the measuring run or due to non-uniform wear. The unbalance measuring operation on a machine according to the invention is therefore not falsified by any unbalance errors of the entrainer device, particularly in cases where the device is driven from the drive motor through a universal-joint shaft or the like articulate connection.

I claim:

1. A balancing machine comprising a fixed machine structure, a rigid frame vibratorily mounted on said structure and having journal means for rotatably supporting a workpiece to be balanced, coupling means rotatably mounted on said frame in coaxial relation to said journal means for rotating the workpiece, a step-down gear mechanism also mounted on said frame and having input and output shafts of which the latter is joined with said coupling means, a cardanic shaft having two ends of which one is connected with said input shaft, a drive motor mounted on said fixed structure, and step-down transmission means connecting said motor with said other end of said cardanic shaft.

2. A balancing machine comprising a bed structure, a supporting structure vibratorily mounted on said bed structure and having workpiece-journalling means for rotatably supporting a workpiece to be balanced, said journalling means defining an axis of workpiece rotation, an entrainer device rotatable about said axis for entraining the workpiece, said entrainer device having first bearing means mounted on said supporting structure and independent of said workpiece-journalling means, a drive shaft journalled on said supporting structure and extending parallel to said axis, said shaft having second bearing means mounted on said supporting structure, a speed-change transmission drivingly connecting said shaft with said entrainer device for driving said entrainer and the workpiece at a rotary speed different from that of said shaft, a drive mounted on said bed structure, a universal-joint connection between said drive and said shaft, and balance measuring means responsive to vibration of said supporting structure and tuned to the rotary frequency of said entrainer device so as to be substantially insensitive to the rotary frequency of said drive shaft.

3. A balancing machine according to claim 2, comprising two balancing weights mounted on said entrainer device, said weights being 90° angularly spaced from each other and adjustable relative to said entrainer device.

4. A balancing machine according to claim 2, comprising balancing weight means mounted on said entrainer device and radially adjustable relative thereto for compensating a given unbalance to remain in the workpiece when finished.

5. In a balancing machine according to claim 2, said axis being vertical, said transmission comprising an entrainer gear rotatable about said vertical axis, and a gear on said drive shaft meshing with said entrainer gear.

6. In a balancing machine according to claim 2, said balance measuring means comprising a phase reference generator, a second speed-change transmission connecting said generator with said drive, said two transmissions having the same transmission ratio so that both said generator and said entrainer device are driven at the same speed different from that of said shaft.

7. In a balancing machine according to claim 6, said two transmissions being step-down gearings so as to drive said entrainer device and said generator at lower speed than said shaft.

8. A balancing machine comprising a supporting structure having workpiece-journalling means for rotatably supporting a workpiece to be balanced, said journalling means defining an axis of workpiece rotation, an entrainer device rotatable about said axis for entraining the workpiece and comprising a substantially U-shaped bracket, said entrainer device having first bearing means mounted on said structure and independent of said workpiece-journalling means, said first bearing means comprising two coaxial bearing units axially spaced from each other and engaging said bracket at opposite longitudinal sides thereof, and said bracket having a hook member for engaging the workpiece for entrainment thereof, a drive shaft journalled on said structure and extending parallel to said axis, said shaft having second bearing means mounted on said structure, a speed-change transmission drivingly connecting said shaft with said entrainer device for driving said entrainer and the workpiece at a rotary speed different from that of said shaft.

9. A balancing machine according to claim 8, comprising counterpoise means joined with said entrainer bracket for individually balancing the latter about its axis of rotation.

10. A balancing machine comprising a supporting structure having workpiece-journalling means for rotatably supporting a workpiece to be balanced, said journalling means defining a vertical axis of workpiece rotation, and comprising an upwardly open, vertical sleeve structure rigidly mounted on said supporting structure and having internal bearings for journalling said workpiece; an entrainer device rotatable about said axis and having first bearing means mounted on said sleeve structure and independent of said workpiece-journalling means, said entrainer device having a gear rotatable on said sleeve structure and entrainer elements fixed to said gear and entrainingly engageable with the workpiece, a drive shaft journalled on said supporting structure and extending parallel to said axis, said shaft having second bearing means mounted on said supporting structure and having gear means meshing with said entrainer gear and forming together therewith a speed-change transmission for driving said entrainer and the workpiece at a rotary speed different from that of said shaft.

11. A balancing machine comprising a bed structure, a supporting structure vibratorily mounted on said bed structure and having workpiece-journalling means for rotatably supporting a workpiece to be balanced, said journalling means defining an axis of workpiece rotation, an entrainer device rotatable about said axis for entraining the workpiece, said entrainer device having first bearing means mounted on said supporting structure and independent of said workpiece-journalling means, a drive shaft journalled on said supporting structure and extending parallel to said axis, said shaft having second bearing means mounted on said supporting structure, a speed-change transmission drivingly connecting said shaft with said entrainer device for driving said entrainer and the workpiece at a rotary speed different from that of said shaft, a drive motor mounted on said supporting structure and drivingly joined with said drive shaft, and a phase-reference generator for balance measuring purposes mounted on said supporting structure and in connection with said drive shaft to be driven therefrom.

12. In a balancing machine according to claim 11, said transmission having a step-down speed ratio between said drive shaft and said entrainer device, said entrainer device comprising a gear rotatable about said axis of workpiece rotation and forming part of said transmission, said drive shaft having gear means meshing with said gear and also forming part of said transmission, and said generator having gear means meshing with said gear.

References Cited in the file of this patent

UNITED STATES PATENTS

| | | |
|---|---|---|
| 1,800,553 | McCabe | Apr. 14, 1931 |
| 2,140,398 | Buckingham | Dec. 13, 1938 |
| 2,171,927 | Fuchs | Sept. 5, 1939 |
| 2,746,299 | Federn et al. | May 22, 1956 |
| 2,787,907 | King | Apr. 9, 1957 |
| 2,940,315 | Rued | June 14, 1960 |